Figure 1:
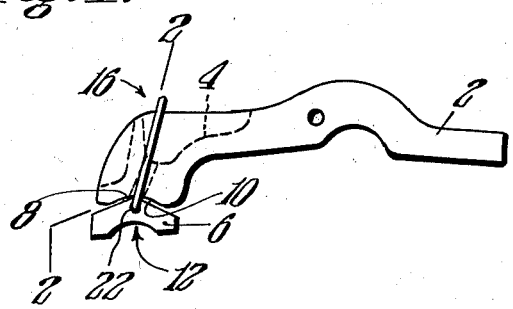

July 14, 1942.                J. H. CONANT ET AL                2,289,628
                          LUBRICATING BEARING MEANS
                              Filed July 31, 1941

INVENTOR.
John H. Conant
BY John C. Tarbell
Walter C. Row, Attorney

Patented July 14, 1942

2,289,628

UNITED STATES PATENT OFFICE 2,289,628

LUBRICATING BEARING MEANS

John H. Conant, Holyoke, and John C. Tarbell, Springfield, Mass.

Application July 31, 1941, Serial No. 404,862

5 Claims. (Cl. 19—138)

This invention relates to improvements in lubricated bearing means.

The invention in its broad aspects is adapted for general application where lubricated bearings are concerned but for purposes of disclosure it will be described in connection with textile apparatus.

Lubrication for journals, bearings, and the like for textile machinery, while necessary, is objectionable for several reasons among which are that it is injurious and damaging to yarns and fabrics and it collects lint, fibers and the like which are always prevalent in a textile plant.

According to this invention we provide self lubricating means which is characterized by its ability to be readily and quickly secured to and removed from a supporting part thereby obviating the necessity of the lubricating operations now necessary and which result in the objections and disadvantages above noted.

The novel features of our invention make it possible to employ the same in connection with existing parts of textile machines and the like and thereby readily and quickly obviate the objections inherent in present day bearing means where there is invariably an excess of lubricant which collects lint, fibers, etc. and which, as stated, is injurious to textile materials.

Among the very many uses for which the invention is adapted is in connection with the saddles of spinning machines, roving machines and the like where rollers have journal parts that are journalled in said saddles and which when lubricated in the ordinary way results in the objectionable conditions referred to.

By means of this invention, a bearing member of some material capable of containing lubricant is provided in combination with attaching means whereby the bearing may be secured to a supporting member such as a saddle in such a way as to be readily and quickly detached therefrom and since the bearing member may contain lubricant so as to supply the desired lubrication there will be no excess lubricant likely to injure textile materials or to collect fibers, lint and the like.

The various novel objects and advantages of the invention will be apparent from the following description of the present preferred form thereof.

Figure 2:
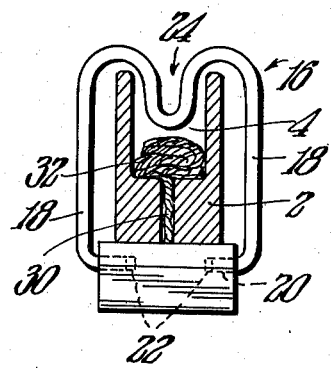

In the drawing:

Fig. 1 is a side elevational view of a saddle for a spinning machine or the like having the novel features of the invention associated therewith; and Fig. 2 is a sectional elevational view on the line 2—2 of Fig. 1.

Referring to the drawing more in detail, the novel features of the invention will be described.

As before stated, the novel features of the invention will be described in connection with a bearing support in the form of a saddle such as used on a spinning machine or the like but is adapted for broad application.

In the drawing, a bearing support is shown at 2 which in the particular instance is a saddle for a spinning machine or the like, the function of which is to engage the journal of a roll. These saddles take various forms, are of various sizes and are mounted in various ways. The saddle of the drawing has a recess 4 which ordinarily may contain lubricant which as pointed out is objectionable.

A bearing member is shown at 6 which has a part 8 adapted to seat in a part 10 of the saddle 2. It also has a journal part 12 for rotatably coacting with a journal part of a roll.

The said bearing member is associated with the saddle by means adapted to facilitate the easy and quick securement to and detachment of the saddle and bearing member.

In the form of the invention shown such means consists of a clip 16 preferably made from more or less spring-like wire. The clip is generally in the form of a U and has side arms 18 terminating in trunnions 20 fitting somewhat loosely in sockets 22 at opposite side parts of the bearing member 6.

The portion of the clip intermediate its ends is formed to provide a loop adapted to be within the recess of the saddle to prevent accidental separation of the bearing member and saddle.

The parts are preferably arranged so that the bearing member may rock to some extent relative to the saddle and also shift slightly transversely thereof. This adjustability allows the bearing member to accommodate itself to the part in rotatable engagement therewith.

The side members of the clip are relatively yieldable so that by spreading them apart the trunnions may be withdrawn from their sockets releasing the bearing member and the clip may be removed from the saddle.

By spreading the side arms of the clip the bearing member may be easily and readily secured to or disengaged from the saddle.

The bearing member will preferably be made from material adapted to contain lubricant for its lubricating function in respect to the journal part associated with the bearing. The bearing may be of fibrous material such as wood which is known to be adapted for impregnation with lubricant. A metal composition may be employed that is characterized by its porosity so as to contain or allow lubricant to pass therethrough.

In any case, it is desired that the bearing member be adapted to contain lubricant in a more or less liquid state so that the same is applied to the journal part when, in the operation of the rotating part, more or less heat, friction, etc. develops.

Because the bearing member is adapted to absorb or contain lubricant or to be impregnated therewith the bearing member may be easily and readily removed from the supporting member and dipped in or have lubricant applied thereto in order to have its supply.

As in a spinning frame where a large number of bearing members are employed, it is an easy matter to remove them and either replace them with a set of previously lubricated members or supply them with lubricant and reapply them. This makes it possible to not only readily and easily provide the lubrication for the coacting surfaces but obviates excess lubricant which has the above referred to objections.

It may be desirable to supply lubricant to the bearing member without removing it from its support and may be accomplished in various ways. For instance, there may be one or more pasageways such as 30 leading from the recess to the bearing to conduct lubricant from the recess and there may be some material in the recess such as wicking 32.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A lubricating device for attachment to a saddle having a recess, a bearing member of porous material adapted to contain lubricant, and a securing member for securing the bearing to a saddle in the form of a U having side arms for disposition at opposite sides of a saddle and trunnions detachably received in sockets of the bearing member, and an intermediate portion receivable in said recess.

2. The combination of a saddle having a recess with bearing means detachable therefrom comprising, a bearing member of porous material adapted to contain lubricant having a journal part, a securing member having side arms at opposite sides of said saddle with trunnion ends disposed in sockets provided in said bearing member with an intermediate portion extending over said saddle, said intermediate portion being formed with a part disposed in said recess.

3. The combination with a saddle having a recess on its upper side and a bearing seat on its lower side of bearing means comprising, a bearing member of porous material adapted to contain lubricant having an upper side adapted to engage said bearing seat and a lower journal bearing part, and securing means in the form of a U having spaced relatively yieldable side arms disposed at opposite sides of the saddle terminating at their lower ends in trunnions disposed in sockets provided in opposite sides of said bearing member and an intermediate portion disposed over the upper side of said saddle having a part extending into the recess thereof.

4. The combination with a saddle having a recess on its upper side and a bearing seat on its lower side of bearing means comprising, a bearing member of porous material adapted to contain lubricant having an upper side adapted to engage said bearing seat and a lower journal bearing part, and securing means in the form of a U having spaced relatively yieldable side arms disposed at opposite sides of the saddle terminating at their lower ends in trunnions disposed in sockets provided in opposite sides of said bearing member and an intermediate portion disposed over the upper side of said saddle having a part extending into the recess thereof, and means for conducting lubricant from the recess of the saddle to the bearing member including a passageway provided in said saddle.

5. The combination with a saddle having a recess on its upper side and a bearing seat on its lower side of bearing means comprising, a bearing member of porous material adapted to contain lubricant having an upper side adapted to engage said bearing seat and a lower journal bearing part, and securing means in the form of a U having spaced relatively yieldable side arms disposed at opposite sides of the saddle terminating at their lower ends in trunnions disposed in sockets provided in opposite sides of said bearing member and an intermediate portion disposed over the upper side of said saddle having a part extending into the recess thereof, and means for conducting lubricant from the recess of the saddle to the bearing member including a passageway provided in said saddle, the upper side of said bearing member and seat arranged and adapted to facilitate tilting movements of the bearing member on said trunnions.

JOHN H. CONANT.
JOHN C. TARBELL.